Feb. 2, 1965   J. C. BOONSHAFT   3,167,963
STRAIN GAGE DIFFERENTIAL PRESSURE TRANSMITTER
Filed April 9, 1962

United States Patent Office 3,167,963
Patented Feb. 2, 1965

3,167,963
STRAIN GAGE DIFFERENTIAL PRESSURE TRANSMITTER
Julius C. Boonshaft, Huntingdon Valley, Pa., assignor to Robertshaw Controls Company, a corporation of Delaware
Filed Apr. 9, 1962, Ser. No. 186,131
4 Claims. (Cl. 73—398)

This invention relates to test instruments, and more particularly to instruments for measuring differential pressures.

There are many types of pressure measuring devices including U-tube manometers, Bourdon tubes, and the like. However, most of the prior art pressure measuring devices are mechanical in nature and are, therefore, subject to many inherent disadvantages. Most mechanical structures are, by their very nature, large and bulky. With bulk goes weight. Large masses are not desirable in this day of miniaturization, particularly if the device is to be used in a wide ranging vehicle such as rocket-powered intercontinental ships or in other devices where space and weight are important. In addition, for control and automation purposes, the output of the measuring instrument should be electrical in nature so that the information output of the instrument can be used for control or data processing purposes by electrical equipment. There are other disadvantages of the prior art pressure measuring instruments such as low orders of accuracy, lost motion, and so forth. In addition, most prior art pressure sensitive devices are readily over-loaded and broken.

In view of the above, it is an object of this invention to provide a new and improved pressure measuring instrument.

It is another object of this invention to provide a new and improved differential pressure measuring instrument.

It is a further object of this invention to provide a new and improved measuring instrument which is small, accurate, rugged, light in weight, and is inherently protected against most overloads.

Other objects and advantages of this invention will become apparent as the following description proceeds, which description should be considered together with the accompanying drawings in which.

Figure 1:
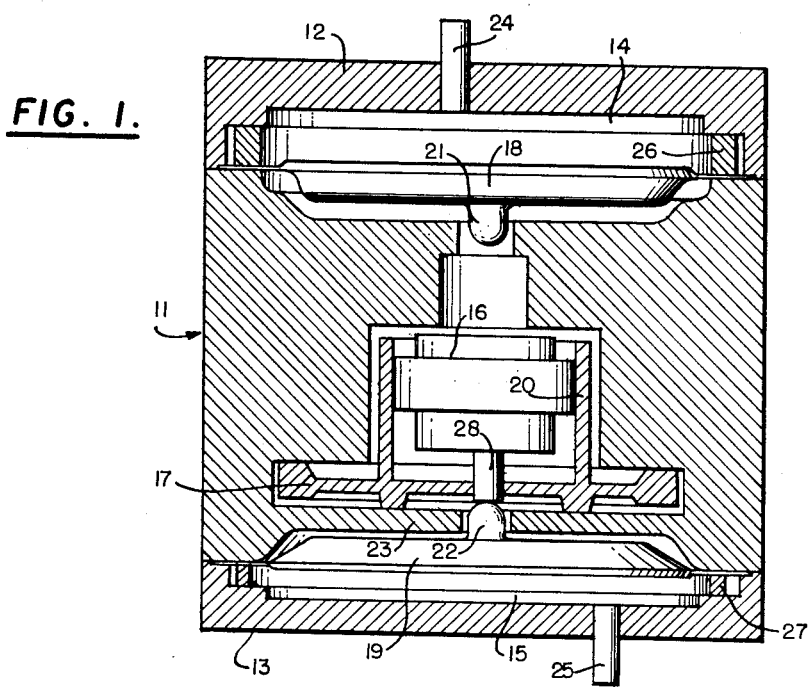
FIG. 1 is a sectional view of one form of the instrument of this invention.

Referring to the drawings in detail, and to FIG. 1 in particular, the reference character 11 designates the body of a differential pressure measuring instrument. The instrument includes a cap 12 and a cap 13 which close the open ends of the body 11. Immediately inside the cap 12 and sealing one end of the central cavity of the body 11 is a flexible diaphragm 18 having a central projection 21. A flexible diaphragm 19 having a central projection 22 seals the other end of the central cavity of the body 11 immediately beneath the cap 13. The diaphragm 18 is mounted on a supporting ring 26 which is attached to the body 11 in a fixed position, and the diaphragm 19 is mounted on a supporting ring 27 which is also attached to the body 11 in a fixed position. A resilient support member 17 is carried by a partition 23 and supports the body of a strain gauge 16. A projection 28 from one end of the strain gauge 16 bears against the projection 22 of the diaphragm 19, and the body of the strain gauge is held by a rim 20 of the resilient support member 17. The cavity between the diaphragms 18 and 19 is filled with a non-compressible fluid (not shown for simplicity). The cap 12 is perforated by an opening through which a nipple 24 is passed to communicate with the space 14 beneath the cap 12, and the cap 13 is penetrated by a nipple 25 which communicates with the space 15 between the cap 13 and the diaphragm 19.

In operation, the strain gauge 16 indicates the difference in the pressure between a system connected to the nipple 24 and one connected to the nipple 25. Each of the pressure systems is sealed from the central cavity in the body 11 by a diaphragm 18 or 19. Thus, when a pressure difference exists between the systems connected to the nipples 24 and 25, that pressure difference is transmitted through the diaphragms 18 and 19 and the non-compressible fluid therebetween. The pressure difference causes the diaphragms 18 and 19 to deflect, moving the projections 22 and 28, and changing the resistance of the strain gauge 16. A portion of strain gauge 16 is held firmly with respect to the body 11 by the rim 20 of the resilient member 17, and is preloaded. That is, with the same pressure on the outsides of the diaphragms 18 and 19, one portion of the strain gauge 16 is clamped so that the projection 28 is forced against the projection 22 with a predetermined force. The extent of the preloading depends upon several factors such as the response curve of the system and the range of pressure differences to be measured. In instruments which have been tested, a preloading equivalent to a pressure difference of 25–50 pounds per square inch in an instrument designated to measure pressure differences of less than 10 p.s.i. was found to be satisfactory. Thus, the instrument responds to pressure differences in either direction. When there is a pressure difference between the two diaphragms 18 and 19, the projection 28 of the strain gauge 16 moves with respect to the main portion of the strain gauge. This changes the length of the strain gauge wires to change the resistance of the gauge. The changes in resistance can be readily measured quite accurately, with a resistance bridge, for example. The amount of movement to cause a substantial change in the resistance of the strain gauge 16 is quite small. Travels of the diaphragms 18 and 19 with respect to housing 11 in the order of 0.010 inch is considered to be normal for the instrument.

Actually, the diaphragm 18 serves as a seal for the system and as a datum against which the diaphragm 19 operates. When the pressure on diaphragm 18 is greater than that on diaphragm 19, the diaphragms 18 and 19 move together toward diaphragm 19, additionally loading the strain gauge 16. In the other circumstance, when the pressure on the diaphragm 19 is greater than that on the diaphragm 18, then the diaphragms move toward diaphragm 18, lowering the loading on strain gauge 16. In either case, it is the travel of the projection 22 on the diaphragm 19 which produces the change in the strain gauge 16. Preferably, the two diaphragms 18 and 19 should have exactly the same areas exposed to each other so that there is no conversion factor involved. By maintaining the strain gauge 16 in a closed system, the fluid in which it is immersed may be readily controlled and selected so that no chemical or other reaction between any of the elements of the strain gauge 16 and the fluid takes place. In ths manner, the operating characteristics of the gauge 16 may be maintained over a long period of time. Also, immersing the gauge 16 in a fluid with good thermal conduction characteristics permits the use of higher electrical power in the unit and reduces the need for amplifiers, while maintaining the temperature of the strain gauge 16 within proper limits. The resilient member 17 is flexed when the pressure difference across the housing 11 is greater than intended, and this flexing serves to reduce the amount of relative movement within the strain gauge itself and to prevent damage to the gauge 16.

Thus, the instrument will withstand large magnitude overloads without serious damage.

Figure 2:
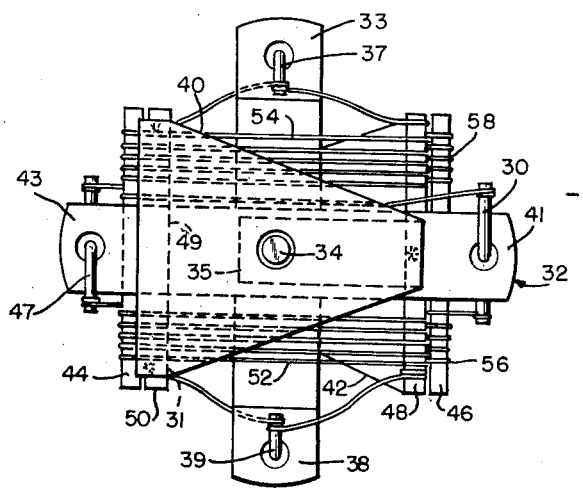
FIG. 2 is a side view of one form of motion sensing device useful in the instrument of FIG. 1.

FIG. 2 illustrates one form of strain gauge which may be used in the instrument of FIG. 1. There are many specific forms which the strain gauge may assume, and that of FIG. 2 is merely illustrative. In addition, the strain gauges described in United States Patents 2,909,743; 2,767,975; and 2,715,332 are examples of strain gauges which are suitable for use in this invention. In FIG. 2, a housing, not shown, contains a supporting structure comprising supporting cross-arms 32, 33, 43, and 38, and having a spindle or shaft 34 passing through central openings therein. Conductive terminal supports 37, 47, 39 and 30 are carried in the outer ends of the arms 32, 33, 43 and 38, and, in turn, connect the ends of strain gauge windings 52, 54, 56 and 58. Non-conductive rods 44, 46, 48 and 50 serve as insulating supports about which the strain gauge windings 52, 54, 56 and 58 are wrapped. A pair of armatures, only one of which is shown at 35, are connected to the shaft 34 on either side of the cross arms 32, 33, 43 and 38. The non-conducting rods 48 and 50 pass through the armatures 35 and are supported thereby, while the non-conducting rods 44 and 46 pass through the support arms 31 and are supported thereby. Flexible plates 40 and 42 of generally triangular shape are connected to the armatures at one end and to support arms 31 at the other end. The outside edges of the cross arms 32, 33, 43, and 38 are attached to the housing which is not shown, and the support arms 31 are connected thereto.

Figure 3:
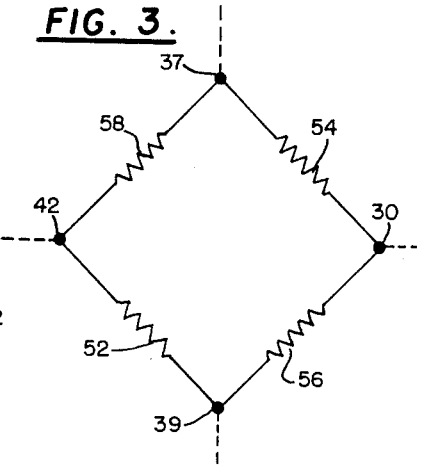
FIG. 3 is a schematic diagram of the circuit connections of the device of FIG. 2.

The flexible plates 40 and 42 permit motion between the armatures 35 and the support arms 31 in the longitudinal direction of the shaft 34 by flexing but prevent rotation of the supporting structure. As shown in FIG. 3, the windings 52, 54, 56 and 58 are connected together by the conductive terminal supports 37, 42, 39 and 30 into a bridge circuit. As the shaft 34 is loaded longitudinally, it moves slightly, moving the armatures 35 with respect to the support arms 31 by bending the flexible plates 40 and 42 and stretching one opposite pair of windings while releasing the tension on the other pair of opposite windings. To illustrate, a movement of the shaft 34 out of the plane of the page toward the viewer would tension or stretch windings 52 and 54 and permit windings 56 and 58 to relax, thus unbalancing the bridge. With the gauge mounted in a housing with one end of the shaft 34 extending out of the gauge housing as shown in FIG. 1 at 28 and with the cross arms 32, 33, 43 and 38 bearing against the housing, motion of the diaphragm 19 causes a corresponding motion on the projection 28 and the shaft 34. Although it has not been shown in the drawings to simplify them, provision is made for electrical connections with the strain gauge bridge, usually by means of simple connectors. One diagonal of the strain gauge bridge is connected to a source of electrical energy, and the other diagonal is connected to a suitable measuring or recording instrument.

The above specification has described a new and improved device for indicating the pressure difference between two fluid systems. The device as described is simple and rugged in strutcure and accurate and reliable in operation, requiring little servicing and repair. It is realized that this description may indicate to those skilled in the art other forms which the invention may assume without departing from the spirit of this disclosure. It is therefore intended that this invention be limited only by the appended claims.

What is claimed is:

1. A device for indicating small differences in the forces exerted by two different systems, said device including a housing having a generally central cavity, a first flexible diaphragm sealing one end of said cavity, means for applying a first force to the outside surface of said first diaphragm, a second diaphragm sealing the other end of said cavity, means for applying a second force to the outside surface of said second diaphragm, a sensor mounted within said cavity between said diaphragms, a non-compressible fluent material filling the remaining space within said cavity between said diaphragms whereby a difference in said first and second forces manifests itself as a movement of the diaphragms toward the smaller force, said sensing means being coupled at one point to said housing and having a sensing projection in contact with at least one of said diaphragms to sense the amount of motion of said diaphragms with respect to said housing, and resilient preloading means for said sensing means serving as the coupling between said sensing means and said housing and comprising a spring member applying a prescribed force between the portion of said sensing means coupled to said housing and said sensing projection to permit the sensing of motions in either direction.

2. The device defined in claim 1 wherein said sensing means comprises an electrical device whose impedance changes in proportion to the amount of movement between the portion coupled to said housing and said sensing projection, and means for determining the amount of change in the impedance of said element.

3. A differential pressure measuring device comprising a hollow housing having one end sealed by a first flexible member and the other end sealed by a second flexible member, an electrical strain gauge positioned within said sealed housing with one portion of the gauge coupled to the housing and another portion of the gauge coupled to one of said members, the remainder of said housing being filled with a substantially incompressible innocuous fluid, and a resilient preloading and overload structure in said housing, said overload structure coupling said one portion of said gauge to said housing by providing a support bed for said gauge, said overload structure being mounted in said housing in a position such that portions of it are not movable with respect to said housing.

4. A differential pressure transducer which comprises a generally hollow cylindrical housing having a flexible member sealing each end of said housing and an electrical strain gauge disposed within said housing; a substantially noncompressible innocuous fluid filling said housing; a resilient member positioned in said housing; said resilient member being attached to said housing to render portions of it relatively immovable with respect to said housing, said resilient member comprising at least a sleeve portion which fits snugly about a portion of said strain gauge to couple said portion of said strain gauge to said housing and a thin resilient portion interposed between said sleeve portion and said housing; and means coupling another portion of said strain gauge to at least one of said flexible members so that as forces applied to said two flexible members become unequal, said flexible members and said other portion of said strain gauge tend to move toward the smaller force while said one portion of said strain gauge and said resilient member remain relatively stationary, a difference in the forces applied to the two flexible members which exceeds the loading maximum of said strain gauge distorting said thin portion of said resilient member and relieving the loading of said strain gauge.

References Cited in the file of this patent

UNITED STATES PATENTS

| | | |
|---|---|---|
| 2,969,514 | Curtis | Jan. 24, 1961 |
| 3,047,022 | Aldinger | July 31, 1962 |